US010507408B2

(12) United States Patent
Wei

(10) Patent No.: US 10,507,408 B2
(45) Date of Patent: Dec. 17, 2019

(54) SUPERFICIALLY POROUS PARTICLES WITH PRECISELY CONTROLLED PARTICLE DENSITY, AND METHODS OF PREPARATION AND USE THEREOF

(71) Applicant: AGILENT TECHNOLOGIES, INC., Santa Clara, CA (US)

(72) Inventor: Ta-Chen Wei, Wilmington, DE (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 680 days.

(21) Appl. No.: 14/898,013

(22) PCT Filed: Jun. 1, 2014

(86) PCT No.: PCT/US2014/040427
§ 371 (c)(1),
(2) Date: Dec. 11, 2015

(87) PCT Pub. No.: WO2015/002711
PCT Pub. Date: Jan. 8, 2015

(65) Prior Publication Data
US 2016/0136542 A1    May 19, 2016

Related U.S. Application Data

(60) Provisional application No. 61/842,007, filed on Jul. 2, 2013.

(51) Int. Cl.
| B01D 15/20 | (2006.01) |
| B01J 20/10 | (2006.01) |
| B01J 20/28 | (2006.01) |
| B01J 20/283 | (2006.01) |
| B01J 20/284 | (2006.01) |
| B01J 20/30 | (2006.01) |

(52) U.S. Cl.
CPC ........... B01D 15/20 (2013.01); B01D 15/206 (2013.01); B01J 20/103 (2013.01); B01J 20/283 (2013.01);
(Continued)

(58) Field of Classification Search
CPC ...... B01D 15/20; B01D 15/206; B01J 20/103; B01J 20/28004; B01J 20/28011;
(Continued)

(56) References Cited

U.S. PATENT DOCUMENTS 4,775,520 A * 10/1988 Unger .................. B01D 15/325
423/335
8,449,856 B2    5/2013 Yano et al.
(Continued)

FOREIGN PATENT DOCUMENTS

| CN | 1872684 A | 12/2006 |
| CN | 101966994 A | 2/2011 |
| CN | 102380345 A | 3/2012 |

OTHER PUBLICATIONS

Bamnolker, H., et al., "New solid and hollow, magnetic and non-magnetic, organic-inorganic monodispersed hybrid microspheres: synthesis and characterization", Journal of Materials Science Letters, 16, pp. 1412-1415 (1997).*
(Continued)

*Primary Examiner* — Benjamin L Lebron

(57) ABSTRACT

The invention provides superficially porous metal oxide particles with precisely controlled particle density and to methods for their preparation and use, as well as to separation devices (e.g., high pressure liquid chromatography) having superficially porous particles.

20 Claims, 5 Drawing Sheets

(52) U.S. Cl.
CPC ....... *B01J 20/284* (2013.01); *B01J 20/28004* (2013.01); *B01J 20/2808* (2013.01); *B01J 20/28011* (2013.01); *B01J 20/28016* (2013.01); *B01J 20/28021* (2013.01); *B01J 20/28059* (2013.01); *B01J 20/28061* (2013.01); *B01J 20/28064* (2013.01); *B01J 20/28069* (2013.01); *B01J 20/28073* (2013.01); *B01J 20/28076* (2013.01); *B01J 20/28078* (2013.01); *B01J 20/28083* (2013.01); *B01J 20/28085* (2013.01); *B01J 20/3057* (2013.01); *B01J 20/3078* (2013.01); *B01J 20/28019* (2013.01)

(58) Field of Classification Search
CPC ............ B01J 20/28016; B01J 20/28019; B01J 20/28021; B01J 20/28059; B01J 20/28061; B01J 20/28064; B01J 20/28069; B01J 20/28073; B01J 20/28076; B01J 20/28078; B01J 20/2808; B01J 20/28083; B01J 20/28085; B01J 20/283; B01J 20/284; B01J 20/3057; B01J 20/3078

See application file for complete search history.

(56) References Cited

U.S. PATENT DOCUMENTS

| | | | | |
|---|---|---|---|---|
| 2002/0103074 | A1* | 8/2002 | Wheelock | B01D 53/48 502/159 |
| 2008/0053891 | A1* | 3/2008 | Koops | D01D 5/06 210/483 |
| 2010/0051877 | A1* | 3/2010 | Wei | B01J 20/08 252/408.1 |

OTHER PUBLICATIONS

Li, et al., "Sol-gel coating of inorganic nanostructures with resorcinol-formaldehyde resin", Chemical Communications, 2013, 49: 5135-5137.

Liu, et al., "Preparation of Porous Hollow SiO2 Spheres by a Modified Stober Process Using MF Microspheres as Templates", J Clust Sci, 2012, 23:273-285.

Wei, et al., "Influence of silica forming media on the synthesis of hollow silica microspheres", Microporous and Mesoporous Materials, 2011, 138:17-21.

Zhang, et al., "A dual template method for synthesizing hollow silica spheres with mesoporous shells", Materials Letters, 2009, 63:258-259.

International Search Report and Written Opinion of the International Searching Authority dated Sep. 18, 2014, or International Application No. PCT/US2014/040427.

Dong, et al., "One-Pot Synthesis of Silica Core-shell Particles with Double Shells and Different Pore Orientations from their Nonporous Counterparts", Journal of Materials Chemistry, vol. 22, 2012, 13197-13203.

Huang, et al., "Shell-by-shell Synthesis of Multi-shelled Mesoporous Silica Nanospheres for Optical Imaging and Drug Delivery", Biomaterials, vol. 32, 2011, 556-564.

* cited by examiner

SUPERFICIALLY POROUS PARTICLES WITH PRECISELY CONTROLLED PARTICLE DENSITY, AND METHODS OF PREPARATION AND USE THEREOF

PRIORITY CLAIMS AND RELATED APPLICATIONS

This application claims the benefit of U.S. Provisional Application No. 61/842,007, filed Jul. 2, 2013, the entire content of which is incorporated herein by reference in its entirety.

FIELD OF THE INVENTION

The invention generally relates to metal oxide particles. More particularly, the invention relates superficially porous metal oxide particles with precisely controlled particle density and to methods for their preparation and use, as well as to separation devices (e.g., high pressure liquid chromatography) having superficially porous particles.

BACKGROUND OF THE INVENTION

Recently, superficially porous particles have drawn great interest because of their special characteristics and improvement in separation efficiency. Superficially porous metal oxides, particularly silica particles, are used in chromatography columns to separate mixed substances from one another. Such particles have a nonporous, solid core with an outer porous shell. High-pressure liquid chromatography (HPLC) columns using superficially porous silica particles allow shorter mass transfer distances, resulting in faster mass transfer and separation than conventional columns.

Various methods to prepare superficially porous silica particles have been reported. (U.S. Patent Publ. No. 2007/0189944 A1.) The first method is a spray-drying approach where solid silica particles or cores are mixed with a silica sol. The mixture is sprayed under high pressure through a nozzle into a drying tower at high temperature (e.g., 200° C.). Unfortunately, the particles prepared this way often are incompletely or un-homogeneously coated. Such particles invariably also contain significant concentrations of unwanted totally porous particles of similar size, which come from the sol. Elutriation-fractionation of this product often fails to remove the totally porous particles, making the spray-drying approach less than optimal for producing the desired superficially porous particles. In addition, the spray-drying method can only make particle sizes larger than 5 µm, mostly in the 30 µm to 100 µm range, and such particles tend to have broad particle size distributions.

A second conventional method is a multilayer approach, in which solid (i.e., non-porous) silica cores are repeatedly coated with layers of colloidal particles by alternating layers of oppositely charged nanoparticles and polymers containing amino-functional groups until the particles reach the desired sizes. (U.S. Pat. No. 3,505,785; U.S. Patent Publ. No. 2007/0189944 A1.) The process is labor intensive and very difficult to practice. When the method is applied on small cores with size less than 2 µm, the final particle surface tends to become less spherical and rougher. The process generates many different types of aggregated particles, resulting in loss of yield of the desired particles.

A third conventional method involves coacervation. In this method, solid (i.e., non-porous) silica spheres are suspended in a coacervation reaction mixture including urea, formaldehyde, and colloidal silica sol under acidic conditions. A coacervate of urea-formaldehyde polymer and ultra-pure silica sol is thus formed and becomes coated on the solid spheres (Kirkland 2000 *J. Chromatography A* 890, 3-13). The urea-formaldehyde polymer is then removed by burning at 540° C. The particles are then strengthened by sintering at an elevated temperature. This procedure is much simpler and more practical compared to the multilayer approach described above. However, the coacervation method has its drawbacks. One is that some of the solid particles often are not coated, leaving non-porous particles in the finished product. Another drawback is that much smaller totally porous particles are formed along with the coated and uncoated particles, necessitating further classification of totally porous particles and superficially porous particles.

Thus, conventional methods of preparing superficially porous silica particles all use solid silica nanoparticles as the building blocks on which an outer porous shell is added. As a result, the porous shell has randomly distributed pores with wide pore size distribution. The pore size is mainly controlled by the size of silica nanoparticles and the tortuous pore channel is determined by how those nanoparticles randomly aggregated. These superficially porous particles with a solid core and a porous layer usually have a particle density between 1.5 $cm^3/g$ to 1.7 $cm^3/g$, which is much higher than 0.8 $cm^3/g$ to 1.2 $cm^3/g$ for the totally porous particles. The high particle density mainly contributed from the solid core that possesses 70 vol.% to 80 vol.% of the particle. Moreover, the resulting rough external particle surfaces limit the performance of columns using such particles at high flow rates due to an unusually high film mass transfer resistance. Rough surfaces also limit the packing density because of increased friction forces among particles during the packing process. (Gritti, et al. 2007 *J. Chromatogr. A* 1166, 30-46).

When used as solid phase in separation columns, the chromatographic performance is highly related to how well the column is packed. An efficient packing technique is to use a slurry solvent whose density approached that of totally porous silica particles. So the particles tended not to settle during the column packing process. Also higher packing pressure generally was found favored for both performance and stability. (Kirkland 2006 *J. of Chromatography A.* 1126, 50.) As a result it is much more difficult to pack superficially porous particles because of their high particle density. Not only it is hard to find a high density solvent to match particle's density but also require strong particles to withstand the higher packing pressures.

Thus, there is a need to make both superficially porous silica particles with a narrow particle size distribution, narrow pore size distribution, high specific surface area and a porous outer layer for faster separation, lower chromatography column pressure drop, and higher efficiency, together with stability at high pH and with good mechanical strength under chromatography conditions.

SUMMARY OF THE INVENTION

The invention is based in part on the unique superficially porous particles with a hollow core and precisely controlled and tunable particle density. The superficially porous silica particles are also characterized by narrow particle size distribution, narrow pore size distribution, high specific surface area, and a porous outer layer.

These novel particles are ideally suited for faster separation, lower chromatography column pressure drop, and higher efficiency, stability at high pH, as well as excellent mechanical strength under chromatography conditions.

In one aspect, the invention generally relates to a plurality of superficially porous particles. Each superficially porous particle includes: a hollow core; a non-porous inner shell; and a substantially porous outer shell. The hollow core has a radius ranging from about 20% to about 90% of the radius of the entire particle. The particles have a median size range from about 0.5 μm to about 100 μm with a particle size distribution (one standard deviation) of no more than 15% of the median particle size; the particles have a specific surface area of from about 5 m$^2$/g to about 1,000 m$^2$/g. The particles comprise a metal oxide selected from silica, alumina, titania or zirconia.

In another aspect, the invention generally relates to a method for making superficially porous particles. The method includes: providing a plurality of monodisperse polymer particles; forming a porous silica inner shell covering the polymer particles; forming a superficially porous silica outer shell covering the non-porous silica inner shell; removing the plurality of polymer particles to form hollow cores; and calcining the porous silica inner shell to form a non-porous silica inner shell.

DETAILED DESCRIPTION OF THE INVENTION

The invention provides unique superficially porous particles with a hollow core and precisely controlled and tunable particle density. These particles are also characterized by narrow particle size distribution, narrow pore size distribution, high specific surface area, and a porous outer layer.

The superficially porous particles of the invention are ideally suited for faster separation, lower chromatography column pressure drop, and higher efficiency, stability at high pH, as well as excellent mechanical strength under chromatography conditions.

The superficially porous particles of the invention have precisely controlled particle density because of the controlled geometries and dimensions of the hollow core, the non-porous inner shell and the superficially porous outer shell, the compositions and relative ratios of which can be used to fine-tune the particle density as well as other physical and performance characteristics of the particles such as particle size and mechanical strength.

Figure 1:
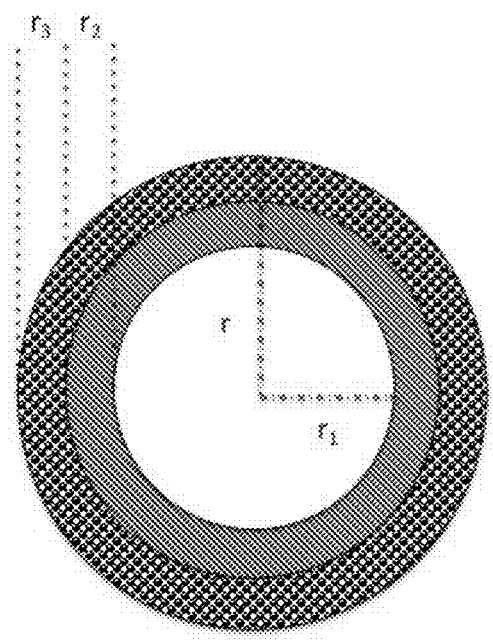
FIG. 1 shows a schematic illustration of a superficially porous particle of an embodiment of the invention.

Referring to FIG. 1, which is a schematic illustration of an embodiment of the superficially porous particles of the invention, the particle 100 has a hollow core 110 having a radius $r_1$, a non-porous inner shell 120 having a thickness $r_2$, and a porous outer shell 130 having a thickness $r_3$. The particle has an overall radius $r=(r_1+r_2+r_3)$. Pores 135 are found in the porous outer shell 130. $r_1$ is determined according to the desired particle density, usually the resulting volume of hollow core occupy from about 20% to about 60% of the total volume of a particle. $r_2$ controls the particle strength and particle density. Usually the resulting volume of non-porous inner shell occupies from about 5% to about 25% of the total volume. $r_3$ is selected based on the target surface area. Usually the resulting volume of the porous outer shell occupies from about 5% to about 70% of the total volume.

In an exemplary embodiment of making the superficially porous particles, monodisperse polymer particles are prepared in a mixture of ammonia hydroxide, ethanol and water. Then, a specific amount of tetraethyl orthosilicate is added into the solution to form a solid silica layer on top of each polymer particle. The particles are then isolated and placed in a mixture of surfactant and swelling agents in basic aqueous solution. After reacting in the solution for certain time, the particles were collected and calcined in the oven to remove the polymer core and micelles formed by surfactant in the outer layer.

In one aspect, the invention generally relates to a plurality of superficially porous particles. Each superficially porous particle includes: a hollow core; a non-porous inner shell; and a substantially porous outer shell. The hollow core has a radius ranging from about 20% to about 90% of the radius of the entire particle. The particles have a median size range from about 0.5 μm to about 100 μm with a particle size distribution (one standard deviation) of no more than 15% of the median particle size; the particles have a specific surface area of from about 5 to about 1,000 m$^2$/g. The particles comprise a metal oxide selected from silica, alumina, titania or zirconia.

The superficially porous particles may have a density from about 0.5 cm$^3$/g to about 1.5 cm$^3$/g, preferably from about 0.8 cm$^3$/g to about 1.2 cm$^3$/g.

This sizes and shapes of superficially porous particles may be fine-tuned to meet the needs of the application. In certain embodiments, for examples for use in liquid chromatography, the superficially porous particles may be substantially uniform spheres in shape.

The superficially porous particles may have any suitable particle sizes, for example, a median particle size from about 0.5 μm to about 10 μm (e.g., from about 0.5 μm to about 8.0 μm, from about 0.5 μm to about 6.0 μm, from about 0.5 μm to about 5.0 μm, from about 0.5 μm to about 4.0 μm, from about 0.5 μm to about 3.0 μm, from about 0.5 μm to about 2.0 μm, from about 1.0 μm to about 8.0 μm, from about 1.0 μm to about 5.0 μm, from about 1.0 μm to about 3.0 μm, from about 1.0 μm to about 2.0 μm).

In certain embodiments, the substantially porous particles have particle size distribution (one standard deviation) is 15% or less (e.g., 10% or less, 7% or less, 5% or less) of the median particle size.

In certain embodiments, the substantially porous particles have outer shells with ordered pores with a median pore size ranges from about 15 Å to about 1,000 Å (e.g., from about 15 Å to about 800 Å, from about 15 Å to about 500 Å, from about 15 Å to about 300 Å, from about 15 Å to about 200 Å, from about 15 Å to about 100 Å, from about 25 Å to about 1,000 Å, from about 50 Å to about 1,000 Å, from about 100 Å to about 1,000 Å, from about 60 Å to about 800 Å, from about 70 Å to about 300 Å).

In certain embodiments, the substantially porous particles have outer shells with ordered pores with a pore size distribution (one standard deviation) of no more than 50% of the median pore size (e.g., no more than 40%, no more than 30%, no more than 25%, no more than 20%, no more than 15%, no more than 10%).

As used herein, the term "ordered pores" refers to a matrix of pores arranged in an orderly assembly structure (rather than in a random assembly structure). The orderly assembly structure can be measured using X-ray powder diffraction analysis such as by one or more peaks at a diffraction angle that corresponds to a d-value (or d-spacing) of at least 1 nm in an X-ray pattern. An ordered structure diffracts X rays in a manner that certain diffracted rays may be "additive" when reaching a detector (or allocation on an array detector or film), while other rays will not be additive. (See, e.g., Bragg equation; http://www.eserc.stonybrook.edu/projectjava/bragg/). Briefly, two diffracted rays will arrive at the detector location in an additive manner if: nl=2 d sin θ, wherein n is an integer, l is the wavelength of the X ray, θ is the angle and d is the inter-atomic spacing. Only when a substance with an ordered structure will the diffraction produce enough additive diffractive beams to produce a peak with the magnitude of the peak indicative of the level of orderness of the substance. Thus, the presence or absence and the intensity of the peak are indicative of the "orderness" of the substance.

In certain embodiments, the hollow cores of the substantially porous particles are characterized by a radius ranging from about 40% to about 80% (e.g. from about 40% to about 70%, from about 40% to about 60%, from about 50% to about 80%, from about 60% to about 80%, about 40%, about 50%, about 60%, about 70%, about 80%) of the radius of the entire particle.

In certain embodiments of the substantially porous particles, their specific surface area of the particles is from about 5 m$^2$/g to about 300 m$^2$/g (e.g., about 5 m$^2$/g to about 200 m$^2$/g, about 5 m$^2$/g to about 150 m$^2$/g, about 5 m$^2$/g to about 120 m$^2$/g, about 20 m$^2$/g to about 300 m$^2$/g, about 20 m$^2$/g to about 200 m$^2$/g, about 20 m$^2$/g to about 150 m$^2$/g, about 20 m$^2$/g to about 120 m$^2$/g, about 50 m$^2$/g to about 300 m$^2$/g, about 50 m$^2$/g to about 200 m$^2$/g, about 50 m$^2$/g to about 150 m$^2$/g, about 50 m$^2$/g to about 120 m$^2$/g).

In certain embodiments, the superficially porous particles include an organically modified hybrid of one or more of said metal oxides. Preferably, an organic metal alkoxide is selected from one or more of the formulae I-IV:

$$(RO)_3M\text{-}R^2\text{-}M(OR)_3 \tag{I}$$

$$(RO)_2R^1M\text{-}R^2\text{-}MR^1(OR)_2 \tag{II}$$

$$(RO)_3M\text{-}R^1 \tag{III}$$

$$(RO)_2M\text{-}R^1R^1 \tag{IV}$$

wherein for formulae I-IV: R is selected independently in each instance from methyl and ethyl, R$^1$ is independently selected in each instance from a substituted or unsubstituted C$_1$ to C$_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and R$^2$ is selected from a substituted or unsubstituted C$_1$ to C$_7$ alkylene, alkenylene, alkynylene, or arylene group bridging two or more M atoms; and M is selected from Si, Ti, and Zr.

When M is Si in Formulae I-IV, the organic metal alkoxide is preferably selected from one or more of methyltriethoxysilane, ethyltriethoxysilane,1,2-bis(triethoxysilyl)methane, 1,2-bis(triethoxysilyl)ethane and 1,2-bis(triethoxysilyl)benzene.

The superficially porous particles may include any suitable metal oxide, for example, silica, alumina, titania or zirconia or a mixture thereof.

The superficially porous particles of the invention can be used in any desired application. In another aspect, the invention generally relates to a separation device having a stationary phase comprising superficially porous particles of the invention. In some embodiments, the superficially porous particles are used in a separation device. The separation device can, for example, include a packed bed of a plurality of particles disclosed herein. The separation device can also comprise a product of the disclosed methods. Examples of suitable separation devices include chromatographic columns, chips, solid phase extraction media, pipette tips and disks.

In another aspect, the invention generally relates to a method for making superficially porous particles. The method includes: providing a plurality of monodisperse polymer particles; forming a porous silica inner shell covering the polymer particles; forming a superficially porous silica outer shell covering the non-porous silica inner shell; removing the plurality of polymer particles to form hollow cores; and calcining the porous silica inner shell to form a non-porous silica inner shell.

In certain preferred embodiments, the plurality of monodisperse polymer particles is prepared in a mixture comprising ammonia hydroxide, ethanol and water; the non-porous silica inner shell covering the polymer particles is formed by adding tetraethyl orthosilicate into the mixture; the superficially porous silica outer shell covering the non-porous silica inner shell is formed in a basic aqueous solution of surfactant and swelling agent; and the hollow cores are formed by burning off the swelling agent, the surfactant and the plurality of polymer particles.

Any suitable polymer particles may be used, including but not limited to, phenols, melamine, urea, aniline, or resorcinol-formaldehyde. The polymer particle can be cross-linked or not and can be of any molecular weight.

Any suitable surfactants may be used. One or more ionic surfactants or non-ionic surfactants are preferred. More preferably, the surfactant is selected from one or more of the group of polyoxyethylene sorbitans, polyoxythylene ethers, block copolymers, alkyltrimethylammonium, alkyl phosphates, alkyl sulfates, alkyl sulfonates, sulfosuccinates, carboxylic acid, surfactants comprising an octylphenol polymerized with ethylene oxide, and combinations thereof. Most preferably the surfactant(s) is selected from one or more of a compound of the formula $C_nH_{2n+1}(CH_3)_3NX$, wherein X is selected from chlorine and bromine, and n is an integer from 10 to 20. Preferred surfactants include trimethyloctadecylammonium bromide and hexadecyltrimethylammonium bromide.

Any suitable swelling agent may be used. The process preferably employs a swelling agent that can dissolve into the surfactant micelles. The swelling agent causes the micelles to swell, increasing (adjusting) the size of the pores to the desired size. Preferably, the mixture of the pH adjuster (the base or acid), solid silica (or other metal oxide) particles and surfactant is heated for a time (e.g., 20 minutes to 1.5 hours) at a temperature of from 30° C. to 60° C. before the swelling agent is added. The mixture containing the swelling agent is heated from 15 min to one month (but preferably less than about 7 days) at a temperature of from about 75° C. to about 110° C., whereupon the mixture is preferably refluxed as described above.

Preferred swelling agents include but are not limited to an alkyl substituted benzene, a dialkylamine, a trialkylamine, a tertraalkyl ammonium salt, an alkane of the formula $(C_nH_{2n-2})$ where n is an integer of 5-20 (Ulagappan 1996 *Chem. Commun.* 2759), a cycloalkane of the formula $(C_nH_{2n})$ where n is an integer of 5-20, a substituted alkane of the formula $(X-C_nH_{2n+1})$ where n is an integer of 5-20 and X is chloro, bromo, or —OH, or a substituted cycloalkane of the formula $(X-C_nH_{2n-1})$ where n is an integer of 5-20 and X is chloro-, bromo-, or —OH. More preferred swelling agents include trimethylbenzene (U.S. Pat. No. 5,057,296); triisopropylbenzene (Kimura, et al. 1998 *J. Chem. Soc., Chem. Commun.* 5, 559); N,N-dimethylhexadecylamine, N,N-dimethyldecylamine, trioctylamine and tridodecylamine (Sayari, et al. 1998 *Adv. Mater.* 10, 1376); cyclohexane, cyclohexanol, dodecanol, chlorododecane and tetramethylammonium and tetraethylammonium sodium salts (Corma, et al. 1997 *Chem. Mater.* 9, 2123).

It is noted that removal of polymer particles to form hollow cores and calcination to form non-porous silica inner shells may be performed before or after the formation of the superficially porous silica outer shell. Thus, in certain embodiments, the method for making superficially porous particles include: providing a plurality of monodisperse polymer particles; forming a porous silica inner shell covering the polymer particles; removing the plurality of polymer particles to form hollow cores; calcining the porous silica inner shell to form a non-porous silica inner shell; and forming a superficially porous silica outer shell covering the non-porous silica inner shell.

The superficially porous particles of this invention can also be surface modified, for example, with a surface modifier having the formula $Z_a(R')_b Si-R$, where Z is selected from Cl, Br, I, $C_1-C_5$ alkoxy, dialkylamino, trifluoroacetoxy or trifluoromethanesulfonate; a and b are each an integer from 0 to 3 provided that a+b=3; R' is a $C_1-C_6$ straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

It should be understood that the shape, composition, and size of the core particles can be distributional properties that vary. To that end, it is not required that all the core particles in a given population comprise a uniform size, composition, or shape. It is therefore contemplated that according to aspects of the invention, all or substantially all core particles have the same or similar size, shape, and composition. Alternatively, it is also contemplated that according to other aspects of the invention, the shape, composition, and size of core particles in a given population can vary.

As it will be appreciated by those skilled in the art, in view of the disclosure herein, that various processes and techniques may be used to prepare the outer porous shell. By way of non-limiting example, in some embodiments, the process for preparing the outer porous shell on the non-porous inner shells involves a multi-layering method or a coacervation method (U.S. Pat. No. 3,505,785; U.S. Patent Publ. No. 2007/0189944 A1; Kirkland 2000 *J. Chromatography A* 890, 3-13).

EXAMPLES

Preparation of Superficially Porous Particles

Figure 2:
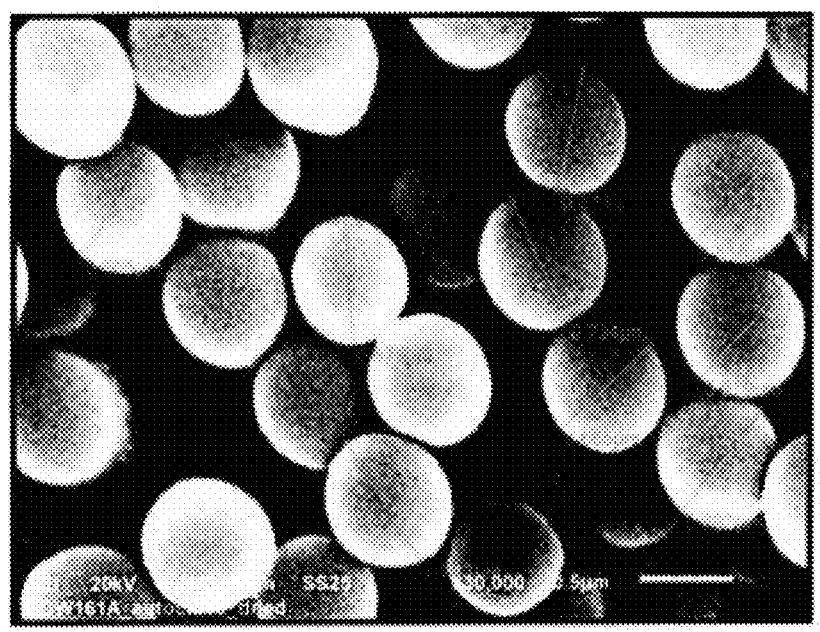
FIG. 2 shows a scanning electron microscope (SEM) image of monodisperse polymer particles.

Step 1: Mix 1 g of ammonium hydroxide, 95 g of ethanol and 160 g of water into a 500 mL flask. Stir the solution for one hour at 30° C. Add 2 g of Resorcinol into the flask for another 30 minutes. Add 3 g of formaldehyde and stir for 24 hours. Centrifuge the solution at 2000 rpm for 20 minutes to isolate the synthesized particles. Add 150 g of ethanol and 12 g of ammonium hydroxide to suspend the polymer particles. The polymer particles observed under a scanning electron microscope (JSM-6510, JEOL) are monodispersed and spherical with a size about 0.7 μm. (FIG. 2)

Figure 3:
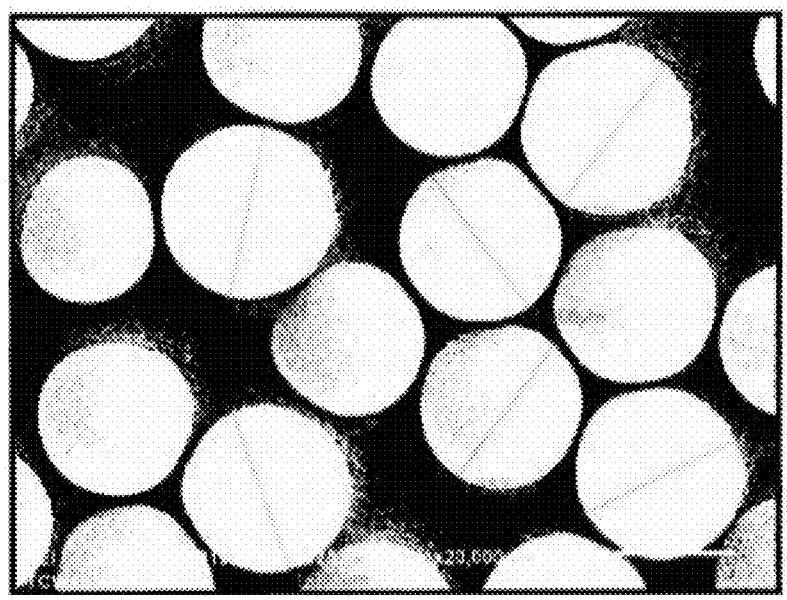
FIG. 3 shows a SEM image of grown particle with silica layer on top of the monodisperse polymer particles.

Step 2: Gradually add 5 g of tetraorthosilicate into the suspension of polymer particles, ethanol and ammonium hydroxide in a flask at 40° C. for 2 hours. To collect the synthesized particles, centrifuge the solution at 2000 rpm for 20 minutes. The collected particles are dried at 120° C. overnight and then observed under a scanning electron microscope (JSM-6510, JEOL). The silica coated polymer particles are monodispersed and spherical with size increase to about 1.4 μm. (FIG. 3)

Figure 4:
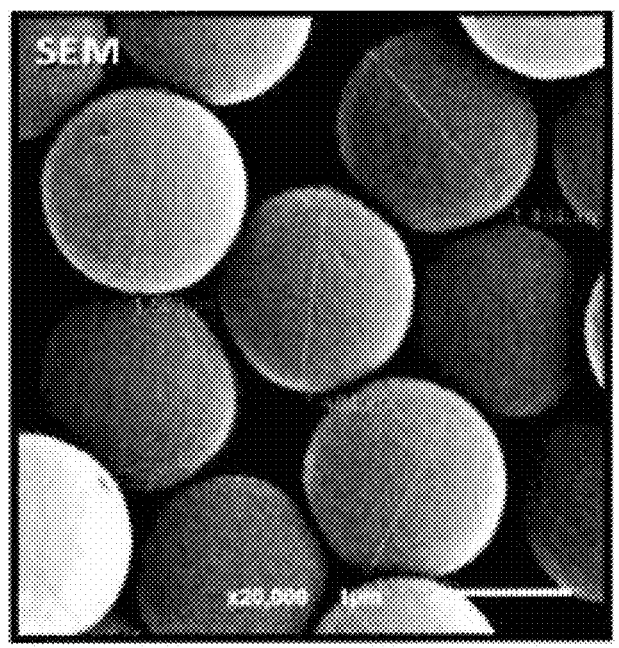
FIG. 4 shows a SEM image of silica-coated particles after burning off surfactants and polymer cores.
Figure 5:
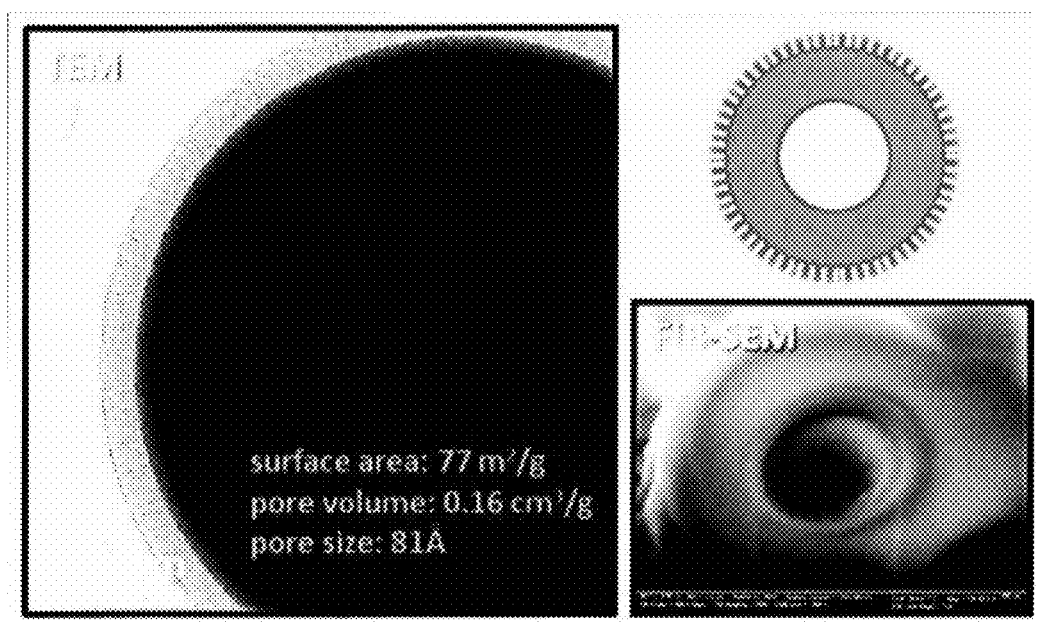
FIG. 5 shows TEM and FIB-SEM (focus ion beam scanning electron microscope) images of the final superficially porous particle with hollow core.

Step 3: Mix 0.5 g of silica coated polymer particles with 0.3 g of tetramethylammonium hydroxide, 1 g of octadecyltrimethylammonium bromide, 200 g of water and 2.3 g of tridecane in a 500 ml flask at 90° C. for 24 hours. Collect the particles and calcine at 600° C. for 6 hours. The final particle size is about 1.6 μm with a pore size of 81 Å and surface area of 77 m$^2$/g measured by a Tristar 3000 analyzer (Micromeritics). For this particle, the size of hollow core is about 0.7 μm and the thickness of non-porous shell is 0.35 μm as observed by a focus ion beam scanning electron microscope (Auriga-60, ZEISS) and the thickness of porous outer layer is 0.1 μm observed by a transmission electron microscope (JEM-2010f, JEOL). (FIG. 4 and FIG. 5) It is noted that a calcination step may be performed at the end of Step 2 rather than as part of Step 3.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

Incorporation by Reference

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

Equivalents

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A plurality of superficially porous particles, each comprising:
   a hollow core;
   a non-porous inner shell; and
   a substantially porous outer shell, wherein
   the hollow core has a radius ranging from about 20% to about 90% of the radius of the entire particle;
   the particles have a median size range from about 0.5 μm to about 100 μm with a particle size distribution (one standard deviation) of no more than 15% of the median particle size; the particles have a specific surface area of from about 5 m$^2$/g to about 1,000 m$^2$/g; and
   the particles comprise a metal oxide selected from silica, alumina, titania or zirconia.

2. The superficially porous particles of claim 1, having a density from about 0.5 cm$^3$/g to about 1.5 cm$^3$/g.

3. The superficially porous particles of claim 1, wherein the substantially porous outer shell comprising ordered pores with a median pore size ranges from about 15 Å to about 1,000 Å with a pore size distribution (one standard deviation) of no more than 50% of the median pore size.

4. The superficially porous particles of claim 1, wherein the hollow core has a radius ranging from about 40% to about 80% of the radius of the entire particle.

5. The superficially porous particles of claim 1, wherein the median size of the particles is from about 0.5 μm to about 10 μm with a particle size distribution (one standard deviation) is 10% or less of the median particle size.

6. The superficially porous particles of claim 3, wherein the pore size ranges from about 60 Å to about 800 Å with a pore size distribution (one standard deviation) is no more than 40% of the pore size median.

7. The superficially porous particles of claim 1, wherein the specific surface area of the particles is from about 5 m$^2$/g to about 300 m$^2$/g.

8. The superficially porous particles of claim 1, wherein the particles comprise an organically modified hybrid of one or more of said metal oxides.

9. The superficially porous particles of claim 1, wherein the particles comprise silica.

10. A separation device having a stationary phase comprising superficially porous particles of claim 1.

11. The separation device of claim 10, wherein the device is a chromatographic column.

12. A method for making the superficially porous particles of claim 1, comprising:
   providing a plurality of monodisperse polymer particles;
   forming a porous silica inner shell covering the polymer particles;
   forming a superficially porous silica outer shell covering the porous silica inner shell;
   removing the plurality of polymer particles to form hollow cores; and
   calcining the porous silica inner shell to form a non-porous silica inner shell.

13. The method of claim 12, wherein
   the plurality of monodisperse polymer particles is prepared in a mixture comprising ammonia hydroxide, ethanol and water;
   the porous silica inner shell covering the polymer particles is formed by adding tetraethyl orthosilicate into the mixture;
   the superficially porous silica outer shell covering the porous silica inner shell is formed in a basic aqueous solution of surfactant and swelling agent; and
   the hollow cores are formed by burning off the swelling agent, the surfactant and the plurality of polymer particles.

14. The method of claim 12, wherein the, surfactant comprises one selected from the group consisting of a polyoxyethylene sorbitan, a polyoxythylene ether, a block copolymer, an alkytrimethylammonium, an alkyl phosphate, an alkyl sulfate, an alkyl sulfonate, a sulfosuccinate, a carboxylic acid, a surfactant comprising an octylphenol polymerized with ethylene oxide, and a combination thereof.

15. The method of claim 12, wherein the swelling agent is selected from an alkyl substituted benzene, a dialkylamine, a trialkylamine, a tetraalkyl ammonium salt, an alkane of the formula $C_nH_{2n+2}$, a cycloalkane of the formula $(C_nH_{2n})$, a substituted alkane of the formula $(X-C_nH_{2n+1})$, or a substituted cycloalkane of the formula $(X-C_nH_{2n-1})$, wherein n is an integer of from about 5 to about 20, and X is chloro-, bromo-, or —OH.

16. The method of claim 12, wherein the superficially porous particles have a density from about 0.5 cm$^3$/g to about 1.5 cm$^3$/g.

17. The method of claim 12, wherein the substantially porous, outer shell comprising ordered pores with a median pore size ranges from about 15 Å to about 1,000 Å with a pore size distribution (one standard deviation) of no more than 50% of the median pore size, with a pore size distribution (one standard deviation) is no more than 40% of the pore size median.

18. The method of claim 12 wherein the hollow core has a radius ranging from about 40% to about 80% of the radius of the entire particle.

19. The method of claim 12, wherein the median size of the particles is from about 0.5 μm to about 10 μm with a particle size distribution (one standard deviation) is 10% or less of the median particle size.

20. The method of claim 12, wherein the specific surface area of the particles is from about 5 m$^2$/g to about 300 m$^2$/g.

* * * * *

UNITED STATES PATENT AND TRADEMARK OFFICE
CERTIFICATE OF CORRECTION

PATENT NO. : 10,507,408 B2
APPLICATION NO. : 14/898013
DATED : December 17, 2019
INVENTOR(S) : Ta-Chen Wei It is certified that error appears in the above-identified patent and that said Letters Patent is hereby corrected as shown below:

On the Title Page

Page 2, Column 2, Item (56), under "Other Publications", Line 14, delete "or" and insert -- for --, therefor.

In the Specification

Column 6, Line 42, delete "polyoxythylene" and insert -- polyoxyethylene --, therefor.

Column 7, Line 1, delete "tertraalkyl" and insert -- tetraalkyl --, therefor.

Column 7, Line 4, delete "($C_nH_{2n}$" and insert -- ($C_nH_{2n}$) --, therefor.

In the Claims

Column 10, Line 21, in Claim 14, delete "the," and insert -- the --, therefor.

Column 10, Line 23, in Claim 14, delete "polyoxythylene" and insert -- polyoxyethylene --, therefor.

Column 10, Line 24, in Claim 14, delete "alkytrimethylammonium," and insert -- alkyltrimethylammonium, --, therefor.

Column 10, Line 41, in Claim 17, delete "porous," and insert -- porous --, therefor.

Column 10, Line 47, in Claim 18, delete "claim 12" and insert -- claim 12, --, therefor.

Signed and Sealed this
Thirtieth Day of June, 2020

Andrei Iancu
*Director of the United States Patent and Trademark Office*